United States Patent
Fan (10) Patent No.: US 9,805,634 B2
(45) Date of Patent: Oct. 31, 2017

(54) DISPLAY PANEL AND IMAGE DISPLAY METHOD TO INCREASE BRIGHTNESS IN A 3D IMAGE DISPLAY MODE

(71) Applicant: SHENZHEN CHINA STAR OPTOELECTRONICS TECHNOLOGY CO., LTD., Guangdong (CN)

(72) Inventor: Deyong Fan, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 160 days.

(21) Appl. No.: 14/651,316

(22) PCT Filed: Apr. 2, 2015

(86) PCT No.: PCT/CN2015/075774
§ 371 (c)(1),
(2) Date: Jun. 11, 2015

(87) PCT Pub. No.: WO2016/154993
PCT Pub. Date: Oct. 6, 2016

(65) Prior Publication Data
US 2017/0039910 A1    Feb. 9, 2017

(30) Foreign Application Priority Data

Mar. 30, 2015 (CN) .......................... 2015 1 0145437

(51) Int. Cl.
*G09G 3/00* (2006.01)
*H04N 13/04* (2006.01)
(Continued)

(52) U.S. Cl.
CPC .............. *G09G 3/003* (2013.01); *G09G 3/36* (2013.01); *H04N 13/0434* (2013.01);
(Continued)

(58) Field of Classification Search
None
See application file for complete search history.

(56) References Cited

U.S. PATENT DOCUMENTS

2007/0070262 A1*  3/2007  Hung ................. G02F 1/136286
                                                  349/43
2011/0216177 A1*  9/2011  Chae ..................... H04N 13/04
                                                  348/57
(Continued)

FOREIGN PATENT DOCUMENTS

| CN | 102338953 A | 2/2012 |
| CN | 10396112 A | 5/2013 |
| CN | 103327350 A | 9/2013 |

*Primary Examiner* — Daniel Hajnik
(74) *Attorney, Agent, or Firm* — Ladas & Parry LLP (57) ABSTRACT

A display panel and an image display method for using in the display panel are provided. The display panel comprises first pixel rows and second pixel rows, the first pixel row is adapted for displaying a three-dimensional image according to a three-dimensional image data and the second pixel row is adapted for displaying a luminance compensated image corresponding to a luminance compensated data according to the luminance compensated data so as to increase a brightness of a screen composed of the three-dimensional image and the luminance compensated image. This increases the brightness of the three-dimensional image displayed by the display panel.

13 Claims, 9 Drawing Sheets

(51) Int. Cl.
*G09G 3/36* (2006.01)
*G02B 27/22* (2006.01)

(52) U.S. Cl.
CPC ..... *H04N 13/0452* (2013.01); *G02B 27/2228* (2013.01); *G09G 2300/02* (2013.01); *G09G 2300/0439* (2013.01); *G09G 2320/0626* (2013.01); *G09G 2320/0646* (2013.01); *G09G 2360/16* (2013.01)

(56) References Cited

U.S. PATENT DOCUMENTS

| | | |
|---|---|---|
| 2012/0013610 A1 | 1/2012 | Chae |
| 2013/0044939 A1* | 2/2013 | Li .................... H04N 13/0025 382/154 |
| 2013/0083095 A1* | 4/2013 | Chueh ............... H04N 13/0418 345/691 |
| 2013/0249971 A1 | 9/2013 | Lee et al. |
| 2014/0118340 A1 | 5/2014 | Huang et al. |

* cited by examiner

| left eye image | right eye image | average gray-scale value | gray-scale value pending to input to a second pixel |
|---|---|---|---|
|  |  | 0 | L(0, 0, 0) |
|  |  | 108 | L(108, 108, 108) |
|  |  | 255 | L(255, 255, 255) |

Fig. 3

| left eye image | right eye image | average gray-scale value | gray-scale value pending to input to a second pixel |
|---|---|---|---|
|  |  | 83 | L(83, 83, 83) |
|  |  | 135 | L(135, 135, 135) |

DISPLAY PANEL AND IMAGE DISPLAY METHOD TO INCREASE BRIGHTNESS IN A 3D IMAGE DISPLAY MODE

FIELD OF THE INVENTION

The present invention relates to the field of display technologies, and more particularly, to a display panel and an image display method thereof.

BACKGROUND OF THE INVENTION

When a conventional display panel is in a three-dimensional image display mode, a displayed right eye image and a displayed left eye image generally need to be isolated through a film-type patterned retarder (FPR) for presenting a three-dimensional image in the eyes of a user.

In the above-described conventional display panel, in order to improve 3D (three-dimensional) viewing angle, the odd-numbered rows of pixels (or even-numbered rows of pixels) are usually closed. Only the even-numbered rows of pixels (or odd-numbered rows of pixels) are used for displaying the three-dimensional image.

In practice, the Applicant of the present invention found that the prior art at least has the following problems:

in the process of displaying the three-dimensional image, the odd-numbered rows of pixels has been turned off. Thus, the overall brightness of the three-dimensional image displayed through the conventional display panel is lower.

Therefore, it is necessary to propose a new technical solution to solve the above problems.

SUMMARY OF THE INVENTION

An object of the present invention is to provide a display panel and an image display method thereof which can increase a brightness of a three-dimensional image displayed by the display panel for improving a display effect of the three-dimensional image displayed by the display panel.

In order to solve the aforementioned drawbacks of the prior art, the technical solution of the present invention provides a display panel and an image display method thereof comprising:

a display panel, comprising: a display unit comprising: two or more first pixel rows arranged in an array along a first direction, the first pixel row is adapted for displaying a three-dimensional image according to a three-dimensional image data while the display panel is in a three-dimensional image display mode; and two or more second pixel rows arranged in an array along the first direction, the second pixel row is adapted for displaying a luminance compensated image corresponding to a luminance compensated data according to the luminance compensated data while the display panel is in the three-dimensional image display mode so as to increase a brightness of a screen composed of the three-dimensional image and the luminance compensated image; the first pixel row and the second pixel row are arranged in a staggered manner; the display panel further comprising: a data processing module adapted for generating the three-dimensional image data while the display panel is in the three-dimensional image display mode and for generating the luminance compensated data according to the three-dimensional image data, and further for providing the first pixel row and the second pixel row with the three-dimensional image data and the luminance compensated data respectively; the data processing module further adapted for generating a two-dimensional image data while the display panel is in a two-dimensional image display mode; the first pixel row and the second pixel row adapted for displaying a two-dimensional image jointly according to the two-dimensional image data while the display panel is in the two-dimensional image display mode; a black mask block interposed between an adjacent first pixel row and second pixel row; the first pixel row comprising two or more first pixels arranged in an array along a second direction; the second pixel row comprising two or more second pixels arranged in an array along the second direction.

In the display panel described above, the data processing module is further adapted for calculating an average gray-scale value of the three-dimensional image corresponding to the three-dimensional image data according to the three-dimensional image data, and the luminance compensated data is in accordance with the average gray-scale value.

In the display panel described above, the average gray-scale value is calculated by the equation: the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

In the display panel described above, the data processing module is further adapted for dividing the three-dimensional image corresponding to the three-dimensional image data into two or more sub-image blocks and for calculating an average gray-scale value of sub blocks of each of the sub-image blocks, and further, for providing the second pixel corresponding to the sub-image blocks in the second pixel row with the average gray-scale value of the sub blocks; the luminance compensated data comprises the average gray-scale value of two or more sub blocks; the second pixel corresponding to the sub-image blocks in the second pixel row is adapted for displaying a luminance compensated sub image according to the average gray-scale value of the sub blocks so as to increase a brightness of a screen composed of the three-dimensional image and the two or more luminance compensated sub images.

In the display panel described above, the average gray-scale value of the sub blocks is calculated by the equation: the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

The present invention further provides a display panel, comprising: a display unit comprising: two or more first pixel rows arranged in an array along a first direction, the first pixel row is adapted for displaying a three-dimensional image according to a three-dimensional image data while the display panel is in a three-dimensional image display mode; and two or more second pixel rows arranged in an array along the first direction, the second pixel row is adapted for displaying a luminance compensated image corresponding to a luminance compensated data according to the luminance compensated data while the display panel is in the three-dimensional image display mode so as to increase a brightness of a screen composed of the three-dimensional image and the luminance compensated image; the first pixel row and the second pixel row are arranged in a staggered manner.

In the display panel described above, the display panel further comprises: a data processing module adapted for generating the three-dimensional image data while the display panel is in the three-dimensional image display mode and for generating the luminance compensated data according to the three-dimensional image data, and further for providing the first pixel row and the second pixel row with the three-dimensional image data and the luminance compensated data respectively.

In the display panel described above, the data processing module is further adapted for calculating an average gray-scale value of the three-dimensional image corresponding to the three-dimensional image data according to the three-dimensional image data; the luminance compensated data is in accordance with the average gray-scale value.

In the display panel described above, the average gray-scale value is calculated by the equation: the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

In the display panel described above, the data processing module is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row with the average gray-scale value of the sub blocks; the luminance compensated data comprises the average gray-scale value of two or more sub blocks; the second pixel corresponding to the sub-image blocks in the second pixel row is adapted for displaying a luminance compensated sub image according to the average gray-scale value of the sub blocks so as to increase a brightness of a screen composed of the three-dimensional image and the two or more luminance compensated sub images.

In the display panel described above, the average gray-scale value of the sub blocks is calculated by the equation: the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

In the display panel described above, the data processing module further adapted for generating a two-dimensional image data while the display panel is in a two-dimensional image display mode; the first pixel row and the second pixel row adapted for displaying a two-dimensional image jointly according to the two-dimensional image data while the display panel is in the two-dimensional image display mode.

In the display panel described above, a black mask block is interposed between an adjacent first pixel row and second pixel row; the first pixel row comprising two or more first pixels arranged in an array along a second direction; the second pixel row comprising two or more second pixels arranged in an array along the second direction.

The present invention further provides an image display method for using in the display panel as described above, comprising steps of: A. displaying a three-dimensional image by a first pixel row according to a three-dimensional image data while the display panel is in a three-dimensional image display mode; B. displaying a luminance compensated image corresponding to a luminance compensated data by a second pixel row according to the luminance compensated data while the display panel is in the three-dimensional image display mode so as to increase a brightness of a screen composed of the three-dimensional image and the luminance compensated image.

In the image display method for using in the display panel described above, before the steps of A and B, further comprising steps of: C. providing a data processing module which is adapted for generating the three-dimensional image data while the display panel is in the three-dimensional image display mode and for providing the first pixel row with the three-dimensional image data; D. providing the data processing module which is adapted for generating the luminance compensated data according to the three-dimensional image data and providing the second pixel row with the luminance compensated data.

In the image display method for using in the display panel described above, after the step of C and before the step of D, further comprising steps of: E. providing the data processing module which is further adapted for calculating an average gray-scale value of the three-dimensional image corresponding to the three-dimensional image data according to the three-dimensional image data; the luminance compensated data is in accordance with the average gray-scale value.

In the image display method for using in the display panel described above, the average gray-scale value is calculated by the equation: the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

In the image display method for using in the display panel described above, after the step of C and before the step of D, further comprising steps of: F. providing the data processing module which is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row with the average gray-scale value of the sub blocks; the luminance compensated data comprises the average gray-scale value of two or more sub blocks, and the step of B further comprising a step of: the second pixel corresponding to the sub-image blocks in the second pixel row is adapted for displaying a luminance compensated sub image according to the average gray-scale value of the sub blocks so as to increase a brightness of a screen composed of the three-dimensional images and the two or more luminance compensated sub images.

In the image display method for using in the display panel described above, the average gray-scale value of the sub blocks is calculated by the equation: the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

In the image display method for using in the display panel described above, the method further comprises steps of: G. providing the data processing module which is adapted for generating a two-dimensional image data while the display panel is in a two-dimensional image display mode; H. providing the first pixel row and the second pixel row are adapted for displaying a two-dimensional image jointly according to the two-dimensional image data while the display panel is in the two-dimensional image display mode.

In comparison with the conventional technology, the present invention can increase a brightness of a three-dimensional image displayed by the display panel such that the display panel has a higher display effect of the three-dimensional image.

To make the above embodiments of the invention more comprehensible, the preferred embodiments being adopted by the present invention to achieve the above and other objectives can be best understood by referring to the following detailed description of the preferred embodiments and the accompanying drawings as detailed below.

DETAILED DESCRIPTION OF THE PREFERRED EMBODIMENTS

Reference throughout this specification to "embodiment" means example, instance, or illustration. In addition, the articles "a" and "an" as used in this specification and the appended claims should generally be construed to mean "one or more" unless specified otherwise or clear from the context to be directed to a singular form.

A display panel of the present invention can be a TFT-LCD (Thin Film Transistor Liquid Crystal Display) or OLED (Organic Light Emitting Diode) and so on.

Figure 1:
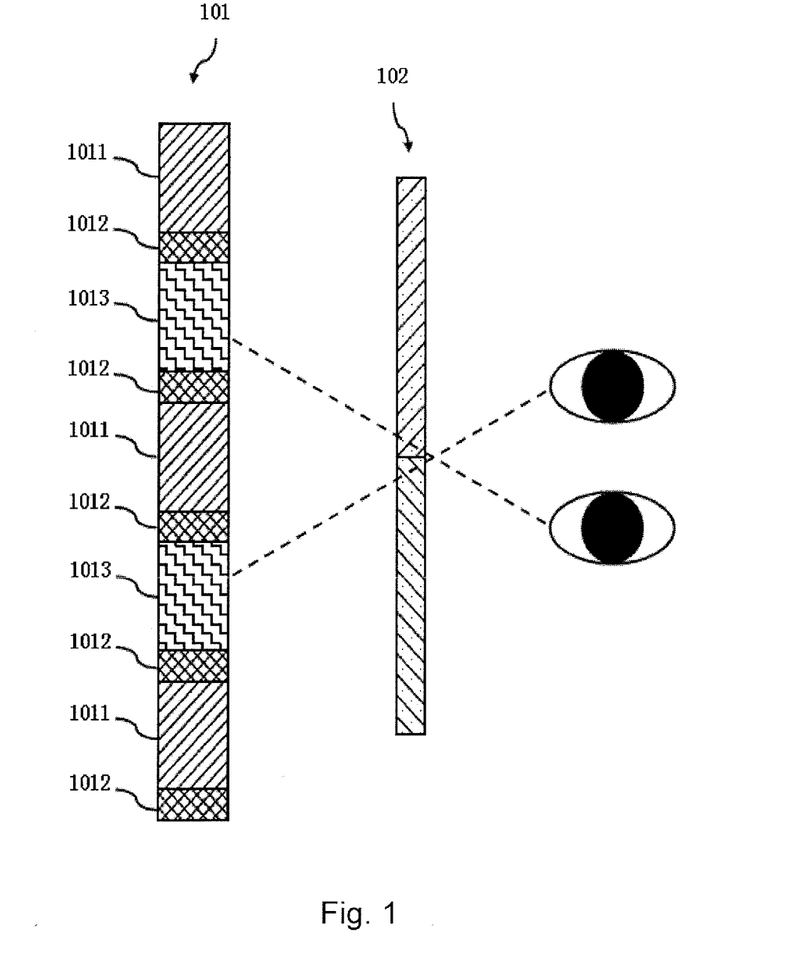
FIG. 1 is a schematic view of a display panel while the display panel is in a three-dimensional image display mode according to the present invention.
Figure 2:
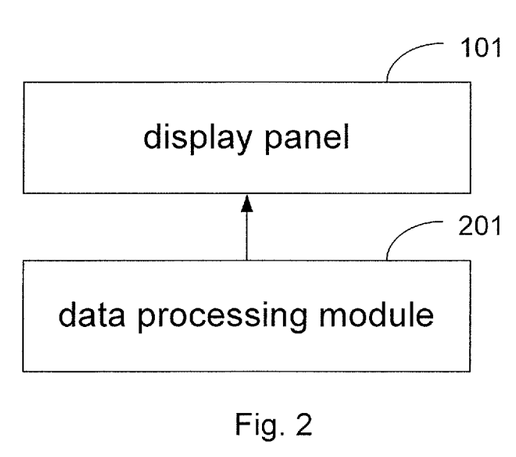
FIG. 2 is a block diagram of the display panel according to the present invention.

Refer to FIG. 1 and FIG. 2, FIG. 1 is a schematic view of a display panel while the display panel is in a three-dimensional image display mode according to the present invention, and FIG. 2 is a block diagram of the display panel according to the present invention.

The display panel of this embodiment comprises a display unit 101 and a data processing module 201. The display unit 101 comprises two or more first pixel rows 1013 and two or more second pixel rows 1011. The first pixel rows 1013 and the second pixel rows 1011 are arranged in a staggered manner. Namely, a second pixel row 1011 is interposed between two adjacent first pixel rows 1013, and a first pixel row 1013 is interposed between two adjacent second pixel rows 1011. A black mask block 1012 is interposed between a first pixel row 1013 and an adjacent second pixel row 1011. A left eye image and a right eye image displayed by the display unit 101 enter into a use's left eye and right eye respectively through a film-type patterned retarder (FPR) 102 so as to present the three-dimensional image.

Two or more first pixel rows 1013 are arranged in an array along a first direction. The first pixel row 1013 and one of the second pixel rows 1011 display the three-dimensional image while the display panel is in a three-dimensional image display mode. For example, the first pixel row 1013 is adapted for displaying the three-dimensional image according to a three-dimensional image data while the display panel is in a three-dimensional image display mode. The first pixel row 1013 includes two or more first pixels which are arranged in an array along a second direction.

Two or more second pixel rows 1011 are arranged in an array along the first direction. The first pixel row 1013 and another one of the second pixel rows 1011 display an image which is adapted for compensating a luminance of the three-dimensional image. For example, the second pixel row 1011 is adapted for displaying a luminance compensated image corresponding to a luminance compensated data according to the luminance compensated data while the display panel is in the three-dimensional image display mode so as to increase a brightness of a screen composed of the three-dimensional image and the luminance compensated image. The second pixel row 1011 includes two or more second pixels which are arranged in an array along the second direction.

The data processing module 201 is electrically connected to the display unit 101. The data processing module 201 is adapted for generating the three-dimensional image data while the display panel is in the three-dimensional image display mode and for generating the luminance compensated data according to the three-dimensional image data, and further for providing the first pixel row 1013 and the second pixel row 1011 with the three-dimensional image data and the luminance compensated data respectively.

Through the above technical solutions, the brightness of the three-dimensional image displayed by the display panel is increased so that the display panel has a higher three-dimensional image display effect. Furthermore, since all of the second pixels of the second pixel rows 1011 have the same gray-scale value inputted, that is, the images of the same gray-scale will be displayed, the luminance compensated image displayed by the second pixel rows 1011 corresponding to the luminance compensated data contains neither a content of the left eye image nor a content of the right eye image. Therefore, a crosstalk problem of the three-dimensional image is avoided.

Figure 3:
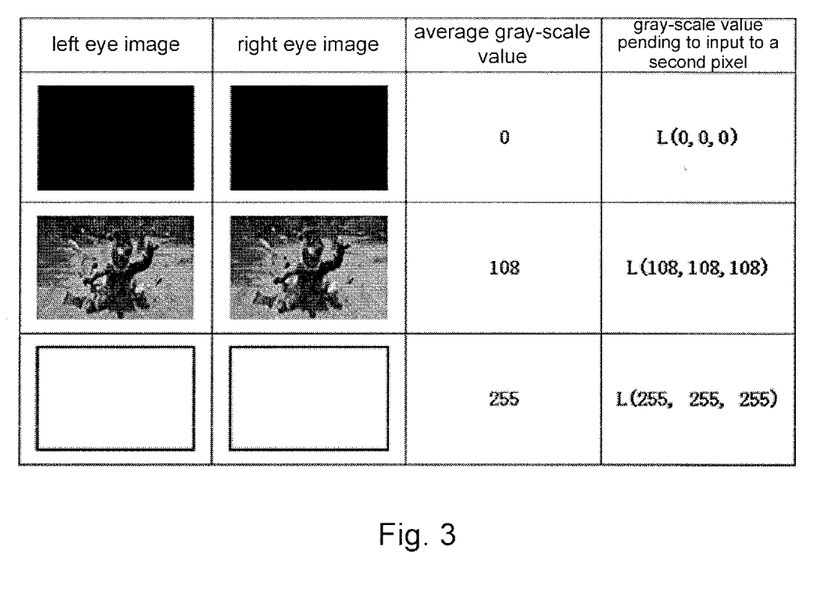
FIG. 3 is a diagram of a relation between a left eye image, right eye image, a corresponding average gray-scale value, and a gray-scale value pending to input to a second pixel according to a first embodiment of the present invention.

Refer to FIG. 3, which is a diagram of a relation between a left eye image, right eye image, a corresponding average gray-scale value, and a gray-scale value pending to input to a second pixel according to a first embodiment of the present invention.

In this embodiment, the data processing module 201 is further adapted for calculating an average gray-scale value of the three-dimensional image corresponding to the three-dimensional image data according to the three-dimensional image data.

Besides, the luminance compensated data is in accordance with the average gray-scale value. The average gray-scale value is calculated by the equation:

the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+ an amount of the subpixels of the right eye image).

Figure 4:
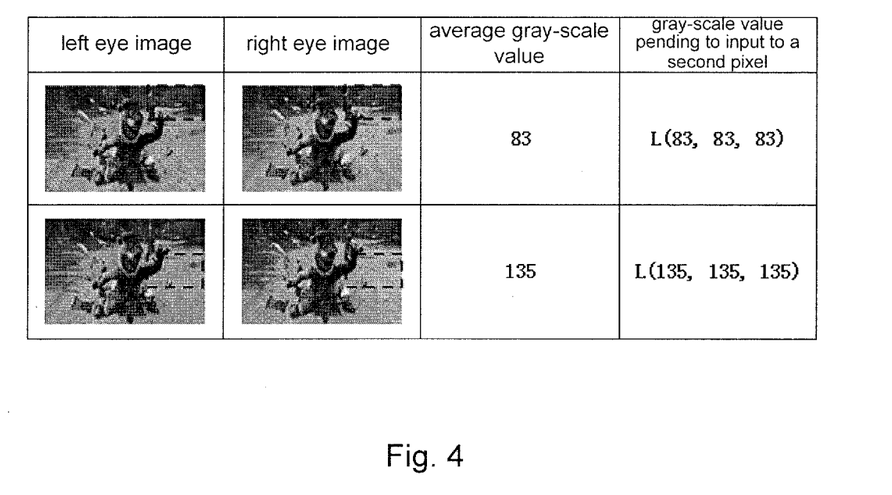
FIG. 4 is a diagram of a relation between a left eye image, right eye image, a corresponding average gray-scale value, and a gray-scale value pending to input to a second pixel according to a second embodiment of the present invention.

Refer to FIG. 4, which is a diagram of a relation between a left eye image, right eye image, a corresponding average gray-scale value, and a gray-scale value pending to input to a second pixel according to a second embodiment of the present invention. The second embodiment is similar to the first embodiment. The difference between the second embodiment and the first embodiment is that:

the data processing module 201 is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row 1011 with the average gray-scale value of the sub blocks.

Besides, the luminance compensated data comprises the average gray-scale value of two or more sub blocks. The average gray-scale value of the sub blocks is calculated by the equation:

the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

The second pixel corresponding to the sub-image blocks in the second pixel row 1011 is adapted for displaying a luminance compensated sub image according to the average gray-scale value of the sub blocks so as to increase a brightness of a screen composed of the three-dimensional image and the two or more luminance compensated sub images.

The display panel of a third embodiment of the present invention is similar to the first embodiment or the second embodiment mentioned above. The difference between the third embodiment and the first embodiment or the second embodiment is that:

The data processing module 201 is further adapted for generating a two-dimensional image data while the display panel is in a two-dimensional image display mode.

The first pixel row 1013 and the second pixel row 1011 are adapted for displaying a two-dimensional image jointly according to the two-dimensional image data while the display panel is in the two-dimensional image display mode.

Figure 5:
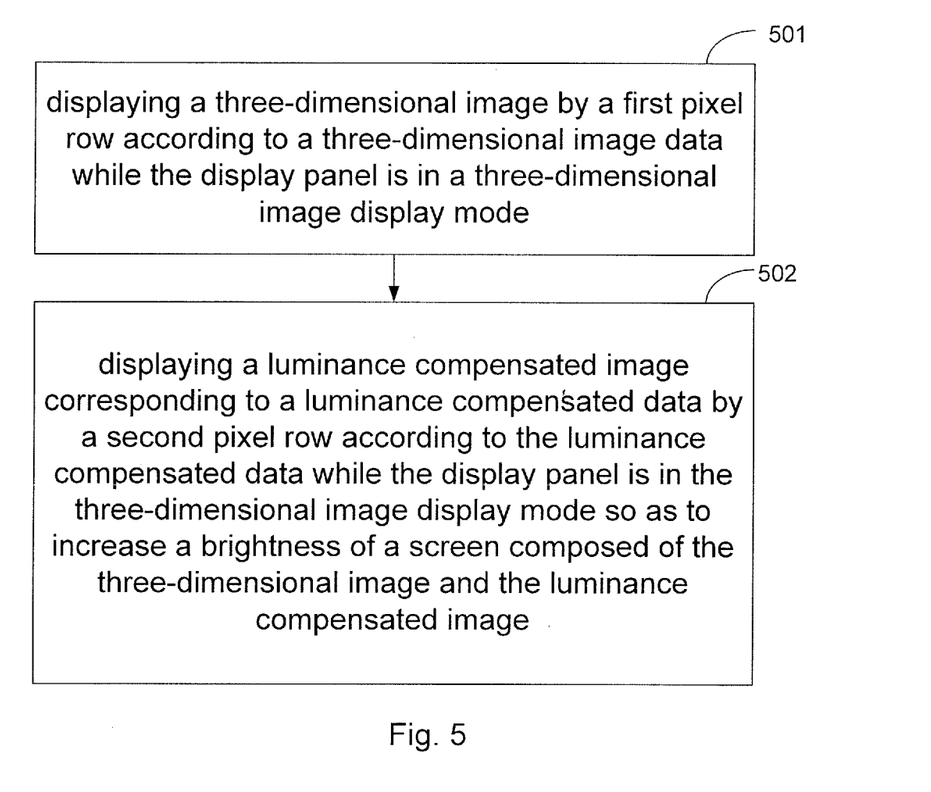
FIG. 5 is a flowchart of a method for displaying a three-dimensional image by using the display panel according to the first embodiment of the present invention.

Refer to FIG. 5, which is a flowchart of a method for displaying a three-dimensional image by using the display panel according to the first embodiment of the present invention.

In this embodiment, the method comprises steps of:

A. In step 501, a three-dimensional image is displayed by a first pixel row according to a three-dimensional image data while the display panel is in a three-dimensional image display mode.

B. In step 502, a luminance compensated image corresponding to a luminance compensated data is displayed by a second pixel row according to the luminance compensated data while the display panel is in the three-dimensional image display mode so as to increase a brightness of a screen composed of the three-dimensional image and the luminance compensated image.

Through the above technical solutions, the brightness of the three-dimensional image displayed by the display panel is increased so that the display panel has a higher three-dimensional image display effect. Furthermore, since all of the second pixels of the second pixel rows 1011 have the same gray-scale value inputted, that is, the images of the same gray-scale will be displayed, the luminance compensated image displayed by the second pixel rows 1011 corresponding to the luminance compensated data contains neither a content of the left eye image nor a content of the right eye image. Therefore, a crosstalk problem of the three-dimensional image is avoided.

Figure 6:
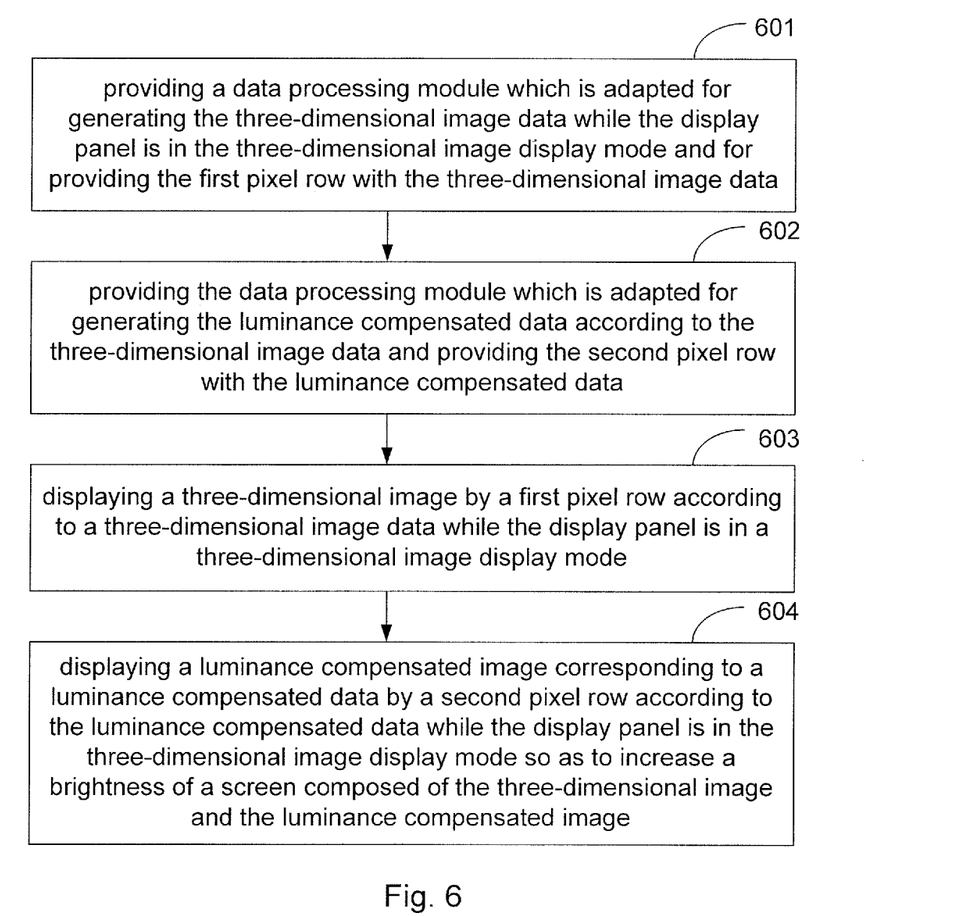
FIG. 6 is a flowchart of a method for displaying a three-dimensional image by using the display panel according to the second embodiment of the present invention.

Refer to FIG. 6, which is a flowchart of a method for displaying a three-dimensional image by using the display panel according to the second embodiment of the present invention.

The second embodiment is similar to the first embodiment. The difference between the second embodiment and the first embodiment is described as follows.

In this embodiment, before the steps A (step 501) and B (step 502), the method further comprises steps of:

C. In step 601, a data processing module 201 is provided and is adapted for generating the three-dimensional image data while the display panel is in the three-dimensional image display mode and for providing the first pixel row 1013 with the three-dimensional image data;

D. In step 602, the data processing module 201 is provided and is adapted for generating the luminance compensated data according to the three-dimensional image data and providing the second pixel row 1011 with the luminance compensated data.

Figure 7:
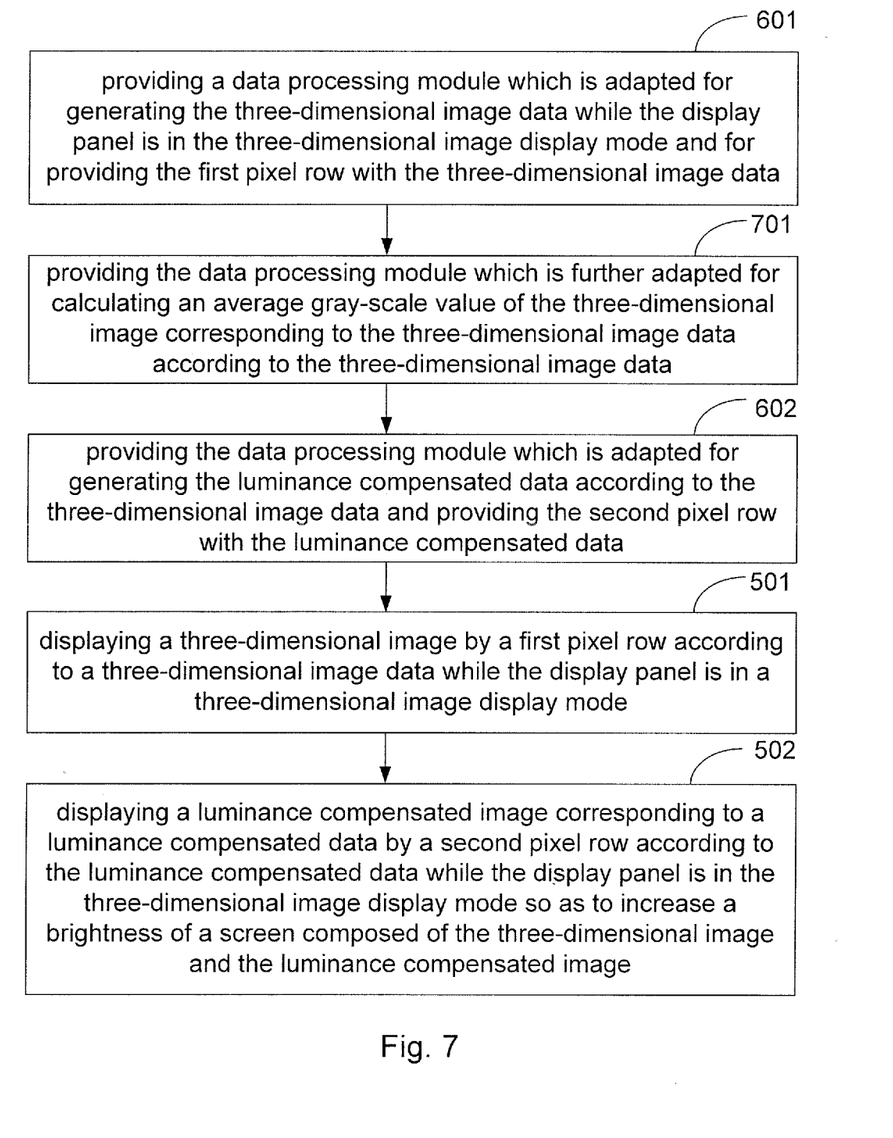
FIG. 7 is a flowchart of a method for displaying a three-dimensional image by using the display panel according to a third embodiment of the present invention.

Refer to FIG. 7, which is a flowchart of a method for displaying a three-dimensional image by using the display panel according to a third embodiment of the present invention.

The third embodiment is similar to the first embodiment or the second embodiment. The difference between the third embodiment and the first embodiment or the second embodiment is described as follows.

In this embodiment, after the step of C (step 601) and before the step of D (step 602), the method further comprises steps of:

E. In step 701, the data processing module 201 is further adapted for calculating an average gray-scale value of the three-dimensional image corresponding to the three-dimensional image data according to the three-dimensional image data.

Besides, the luminance compensated data is in accordance with the average gray-scale value. The average gray-scale value is calculated by the equation:

the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+ an amount of the subpixels of the right eye image).

Figure 8:
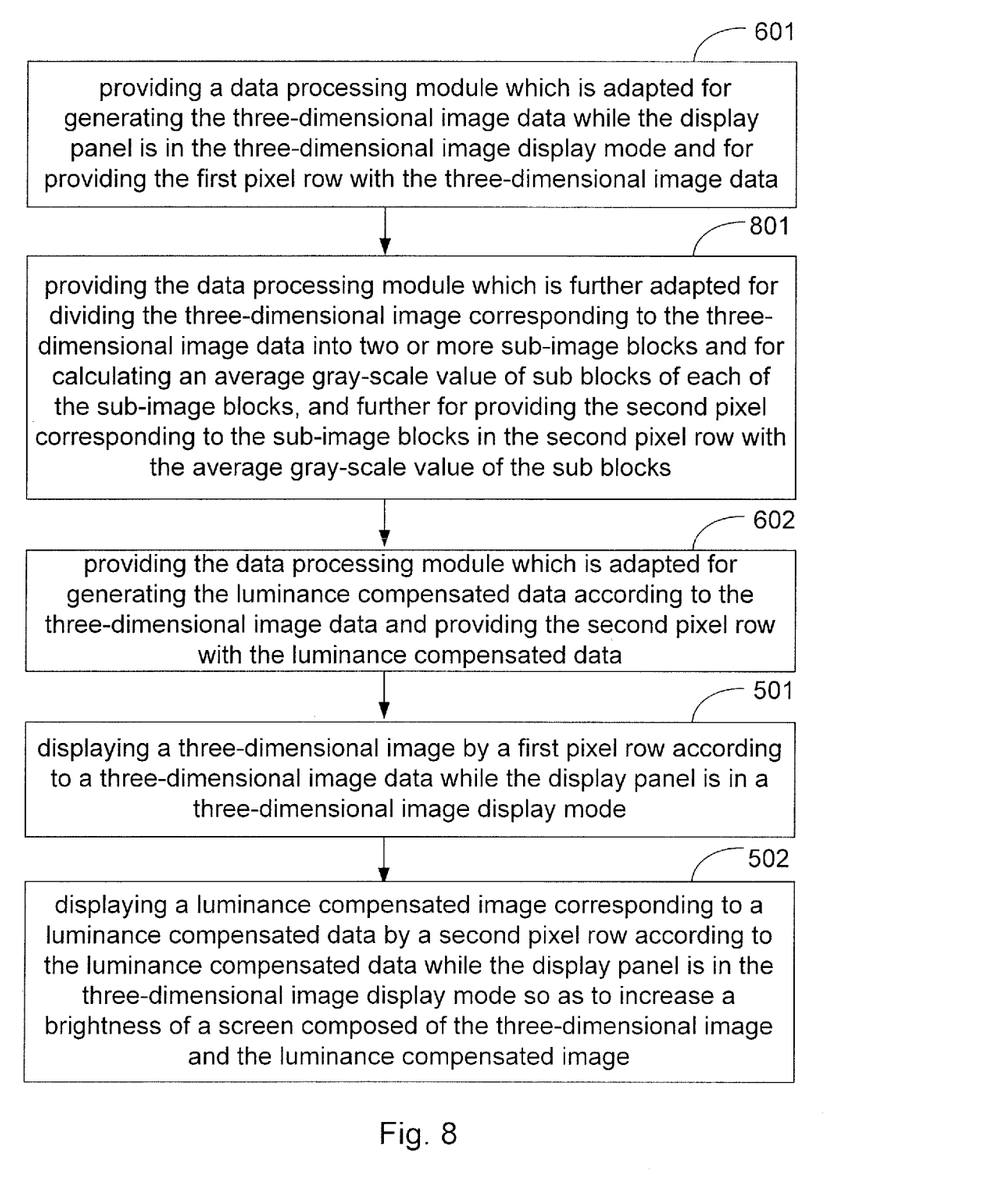
FIG. 8 is a flowchart of a method for displaying a three-dimensional image by using the display panel according to a fourth embodiment of the present invention.

Refer to FIG. 8, which is a flowchart of a method for displaying a three-dimensional image by using the display panel according to a fourth embodiment of the present invention.

The fourth embodiment is similar to the first embodiment or the second embodiment. The difference between the fourth embodiment and the first embodiment or the second embodiment is described as follows.

In this embodiment, after the step of C (step 601) and before the step of D (step 602), the method further comprises steps of:

F. In step 701, the data processing module 201 is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row 1011 with the average gray-scale value of the sub blocks.

Besides, the luminance compensated data comprises the average gray-scale value of two or more sub blocks. The average gray-scale value of the sub blocks is calculated by the equation:

the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

The step B (step 502) further comprises a step of:

the second pixel corresponding to the sub-image blocks in the second pixel row 1011 is adapted for displaying a luminance compensated sub image according to the average gray-scale value of the sub blocks so as to increase a brightness of a screen composed of the three-dimensional image and the two or more luminance compensated sub images.

Figure 9:
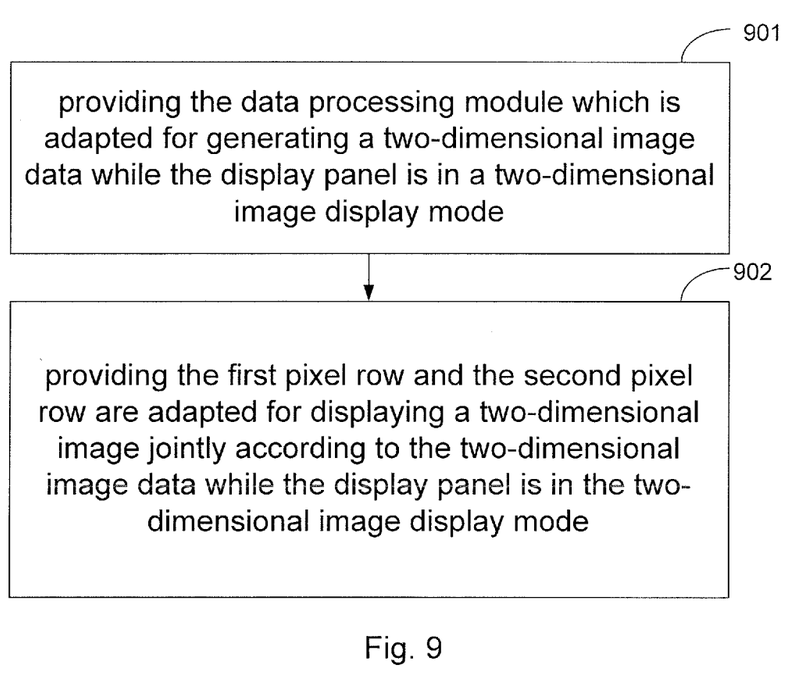
FIG. 9 is a flowchart of a method for displaying a two-dimensional image by using the display panel according to the present invention.

Refer to FIG. 9, which is a flowchart of a method for displaying a two-dimensional image by using the display panel according to the present invention.

This embodiment is similar to any one of the first embodiment to the fourth embodiment. The difference between this embodiment and the first embodiment to the fourth embodiment is described as follows.

In this embodiment, the method further comprises steps of:

G. In step 901, the data processing module 201 is adapted for generating a two-dimensional image data while the display panel is in a two-dimensional image display mode.

H. In step 902, the first pixel row 1013 and the second pixel row 1011 are adapted for displaying a two-dimensional image jointly according to the two-dimensional image data while the display panel is in the two-dimensional image display mode.

What has been described above includes examples of the various embodiments. It is, of course, not possible to describe every conceivable combination of components or methodologies for the purposes of describing the various embodiments, but one of ordinary skill in the art may recognize that many further combinations and permutations are possible. Accordingly, the subject specification is intended to embrace all such alterations, modifications, and variations that fall within the spirit and scope of the appended claims. In particular and in regard to the various functions performed by the above described components, devices, functions, and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods. In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

As described above, the present invention has been described with preferred embodiments thereof, and it is understood that many changes and modifications to the described embodiments can be carried out without departing from the scope and the spirit of the invention that is intended to be limited only by the appended claims.

What is claimed is:

1. A display panel, comprising:
   a display unit comprising:
   two or more first pixel rows arranged in an array along a first direction, the first pixel row is adapted for displaying a three-dimensional image according to a three-dimensional image data while the display panel is in a three-dimensional image display mode; and
   two or more second pixel rows arranged in an array along the first direction, the second pixel row is adapted for displaying a luminance compensated image corresponding to a luminance compensated data according to the luminance compensated data while the display panel is in the three-dimensional image display mode so as to increase a brightness of a screen composed of the three-dimensional image and the luminance compensated image;
   wherein the first pixel row and the second pixel row are arranged in a staggered manner;
   the display panel further comprising:
   a data processing module adapted for generating the three-dimensional image data while the display panel is in the three-dimensional image display mode and for generating the luminance compensated data according to the three-dimensional image data, and further for providing the first pixel row and the second pixel row with the three-dimensional image data and the luminance compensated data respectively;
   the data processing module further adapted for generating a two-dimensional image data while the display panel is in a two-dimensional image display mode;
   the first pixel row and the second pixel row adapted for displaying a two-dimensional image jointly according to the two-dimensional image data while the display panel is in the two-dimensional image display mode;
   a black mask block interposed between two adjacent first pixel row and second pixel row;
   the first pixel row comprising two or more first pixels arranged in an array along a second direction;
   the second pixel row comprising two or more second pixels arranged in an array along the second direction;
   wherein the data processing module is further adapted for calculating an average gray-scale value of the three-dimensional image corresponding to the three-dimensional image data according to the three-dimensional image data, and the luminance compensated data is in accordance with the average gray-scale value;

wherein the average gray-scale value is calculated by the equation: the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

2. The display panel according to claim 1, wherein the data processing module is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row with the average gray-scale value of the sub blocks;

wherein the luminance compensated data comprises the average gray-scale value of two or more sub blocks;

the second pixel corresponding to the sub-image blocks in the second pixel row is adapted for displaying a luminance compensated sub image according to the average gray-scale value of the sub blocks so as to increase a brightness of a screen composed of the three-dimensional image and the two or more luminance compensated sub images.

3. The display panel according to claim 2, wherein the average gray-scale value of the sub blocks is calculated by the equation:

the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

4. A display panel, comprising:
a display unit comprising:
two or more first pixel rows arranged in an array along a first direction, the first pixel row is adapted for displaying a three-dimensional image according to a three-dimensional image data while the display panel is in a three-dimensional image display mode; and
two or more second pixel rows arranged in an array along the first direction, the second pixel row is adapted for displaying a luminance compensated image corresponding to a luminance compensated data according to the luminance compensated data while the display panel is in the three-dimensional image display mode so as to increase a brightness of a screen composed of the three-dimensional image and the luminance compensated image;
a data processing module for calculating an average gray-scale value of the three-dimensional image corresponding to the three-dimensional image data according to the three-dimensional image data, and the luminance compensated data is in accordance with the average gray-scale value;
wherein the first pixel row and the second pixel row are arranged in a staggered manner;
wherein the average gray-scale value is calculated by the equation:

the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

5. The display panel according to claim 4, wherein the data processing module adapted for generating the three-dimensional image data while the display panel is in the three-dimensional image display mode, and for generating the luminance compensated data according to the three-dimensional image data, and further for providing the first pixel row and the second pixel row with the three-dimensional image data and the luminance compensated data respectively.

6. The display panel according to claim 5, wherein the data processing module is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row with the average gray-scale value of the sub blocks;

wherein the luminance compensated data comprises the average gray-scale value of two or more sub blocks;

the second pixel corresponding to the sub-image blocks in the second pixel row is adapted for displaying a luminance compensated sub image according to the average gray-scale value of the sub blocks so as to increase a brightness of a screen composed of the three-dimensional image and the two or more luminance compensated sub images.

7. The display panel according to claim 6, wherein the average gray-scale value of the sub blocks is calculated by the equation:

the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

8. The display panel according to claim 5, wherein the data processing module is further adapted for generating a two-dimensional image data while the display panel is in a two-dimensional image display mode;

the first pixel row and the second pixel row adapted for jointly displaying a two-dimensional image according to the two-dimensional image data while the display panel is in the two-dimensional image display mode.

9. The display panel according to claim 4, wherein a black mask block is interposed between two adjacent first pixel row and second pixel row;

the first pixel row comprising two or more first pixels arranged in an array along a second direction;

the second pixel row comprising two or more second pixels arranged in an array along the second direction.

10. An image display method performed by using a display panel as claimed in claim 4, comprising steps of:
A. displaying a three-dimensional image by a first pixel row according to a three-dimensional image data while the display panel is in a three-dimensional image display mode;
B. displaying a luminance compensated image corresponding to a luminance compensated data by a second pixel row according to the luminance compensated data while the display panel is in the three-dimensional image display mode so as to increase a brightness of a screen composed of the three-dimensional image and the luminance compensated image;

wherein before the steps of A and B, the method further comprises steps of:

C. providing a data processing module which is adapted for generating the three-dimensional image data while the display panel is in the three-dimensional image display mode and for providing the first pixel row with the three-dimensional image data;

D. providing the data processing module which is adapted for generating the luminance compensated data according to the three-dimensional image data and providing the second pixel row with the luminance compensated data;

wherein after the step of C and before the step of D, the method further comprises steps of:

E. providing the data processing module which is further adapted for calculating an average gray-scale value of the three-dimensional image corresponding to the three-dimensional image data according to the three-dimensional image data;

wherein the luminance compensated data is in accordance with the average gray-scale value;

wherein the average gray-scale value is calculated by the equation:

the average gray-scale value=(a sum of gray-scale values of the subpixels of a left eye image of the three-dimensional image+a sum of gray-scale values of the subpixels of a right eye image of the three-dimensional image)/(an amount of the subpixels of the left eye image+an amount of the subpixels of the right eye image).

11. The image display method performed by using a display panel according to claim 10, wherein after the step of C and before the step of D, further comprises steps of:

F. providing the data processing module which is further adapted for dividing the three-dimensional image corresponding to the three-dimensional image data into two or more sub-image blocks and for calculating an average gray-scale value of sub blocks of each of the sub-image blocks, and further for providing the second pixel corresponding to the sub-image blocks in the second pixel row with the average gray-scale value of the sub blocks;

wherein the luminance compensated data comprises the average gray-scale value of two or more sub blocks;

the step of B further comprises a step of:

the second pixel corresponding to the sub-image blocks in the second pixel row is adapted for displaying a luminance compensated sub image according to the average gray-scale value of the sub blocks so as to increase a brightness of a screen composed of the three-dimensional image and the two or more luminance compensated sub images.

12. The image display method performed by using a display panel according to claim 11, wherein the average gray-scale value of the sub blocks is calculated by the equation:

the average gray-scale value of the sub blocks=(a sum of gray-scale values of the subpixels of the sub blocks of a left eye image of the three-dimensional image+a sum of gray-scale values of the subpixels of the sub blocks of a right eye image of the three-dimensional image)/(an amount of the subpixels of the sub blocks of the left eye image+an amount of the subpixels of the sub blocks of the right eye image).

13. The image display method performed by using a display panel according to claim 10 further comprising steps of:

G. providing the data processing module which is adapted for generating a two-dimensional image data while the display panel is in a two-dimensional image display mode;

H. providing the first pixel row and the second pixel row adapted for displaying a two-dimensional image jointly according to the two-dimensional image data while the display panel is in the two-dimensional image display mode.

* * * * *